March 1, 1949. W. W. VANDER CLUTE 2,463,006
WELDED COUPLING
Filed June 11, 1945
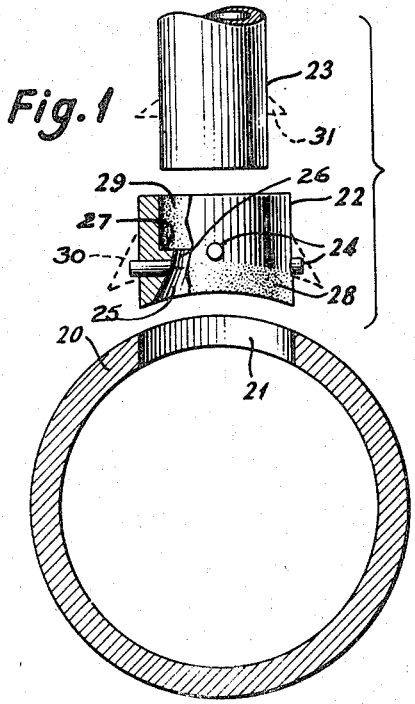
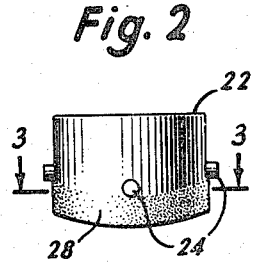
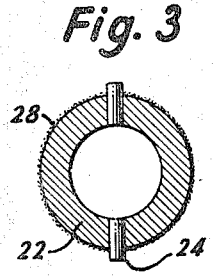
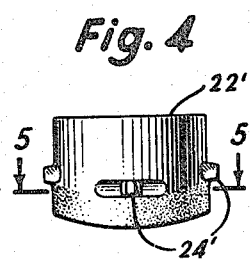
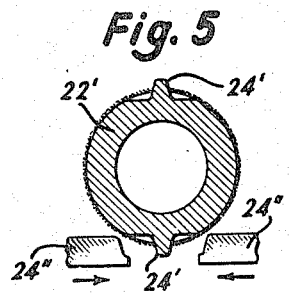
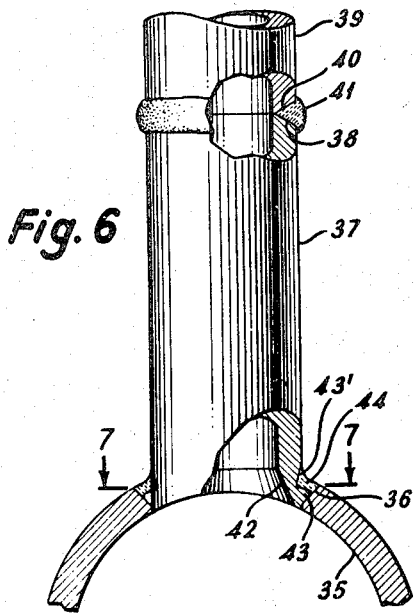
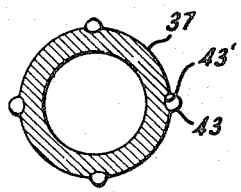
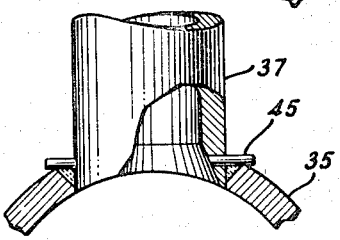
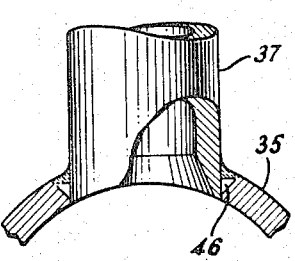
INVENTOR
WILLIAM W. VANDER CLUTE
BY William A. Zalesak
ATTORNEY Patented Mar. 1, 1949

2,463,006

UNITED STATES PATENT OFFICE 2,463,006

WELDED COUPLING

William W. Vander Clute, Elizabeth, N. J., assignor to Round Root Corporation, Elizabeth, N. J.

Application June 11, 1945, Serial No. 598,687

11 Claims. (Cl. 285—106)

My invention relates to welded connections between metallic bodies carrying fluids under pressure, more particularly to welded pipe couplings and to the method and system employed for providing such couplings.

The present application is a continuation-in-part of my copending application Serial No. 531,344, filed April 17, 1944.

Failures of welded couplings utilizing threaded connections have been quite common. This failure of such fittings has been attributed to the inability of these couplings to withstand shock, vibration and relative motion between the small piping and machinery units on which the threaded welded outlet fittings are installed.

In the usual type of welded outlet fitting, it is common practice to make the fittings by pattern where for a lateral or nipple connection to a header a template, shaped to the saddling shape of a pipe saddling another, is placed on the header, and an accurately punched center line is made around the outline of the template. Along this line a mechanic flame cuts to produce an egg-shaped hole in the header pipe and then the wall surface of the header around the hole is filed and ground to a smooth surface. Also, the contacting pipe or nipple has to be ground or fitted to the shape of the header. After this, the lateral pipe is held in position on the header and welded to the header. This not only produces a poorly shaped interior bore connection of the pipe nipple or coupling with the header, but making a coupling in this manner on larger pipes requires in many cases approximately four hours for two men for one welded coupling.

In the usual welded coupling it is practically a very difficult if not impossible operation to provide both inside and outside welds. Such inside and outside welds are highly desirable for the purpose of strengthening the connection.

In the usual arrangement in the method described above proper seating of the fittings or coupling members in the header pipe is difficult to insure, particularly where the so-called shoulder saddling fitting cannot be utilized, as in the case of small size headers and fittings.

In the usual coupling member abrupt angles are presented to the flow of fluid or liquid from the header into the connecting pipe at the coupling.

It is, therefore, an object of my invention to provide an improved form of welded connections and a method and system for providing such connections.

A further object of my invention is to provide such a connection which is substantially immune to shock or vibration and incident relative motion of the parts connected, but which nevertheless provides an easy, quick method for accurately positioning an outlet coupling in relation to a pressure vessel or header piping with which it is used.

A still further object of my invention is to provide a novel welded outlet connection in which the time for making the installation is substantially reduced to a matter of minutes instead of hours.

A still further object of my invention is to provide such a coupling in which inside and outside welds are simultaneously produced without the use of special welding equipment.

Another object of my invention is to provide such a coupling device which is preformed to properly fit a header pipe and which is properly seated for immediate welding operations when the aperture in the header is simply and accurately formed for reception of the coupling member.

A further object of my invention is to provide such a coupling member which insures the free flow of fluid or liquid from the header or vessel into the coupling and associated connecting pipe.

In some applications it is desirable to utilize a beveled aperture in the header member and to insert the coupling member within the aperture with the inner end registering with the inner contour of the header and making a weld between the beveled aperture surface of the header and the coupling. All of the disadvantages and objections pointed out above also apply in this case.

It is therefore another specific object of my invention to provide positioning lugs adjacent the end of the coupling member received within the aperture and having a contour registering with and engaging the beveled surfaces of the aperture.

A still further object of my invention is to provide a lug which may be staked or welded adjacent the end received within the aperture for positioning the member within the aperture.

These and other objects will appear hereinafter.

The novel features which I believe to be characteristic of my invention are set forth with particularity in the appended claims but the invention itself will best be understood by reference to the following description taken in connection with the accompanying drawing in which Fig. 1 shows an exploded view of the elements used in connection with my invention. Fig. 2 is a view 90° with respect to Fig. 1 of the coupling member used in Fig. 1; Fig. 3 is a transverse section taken along the line 3—3 of Fig. 2; Fig. 4 shows a modification of the coupling member shown in Figs. 2 and 3 and made according to my invention; Fig. 5 is a transverse section taken along the line 5—5; Fig. 6 is a view partially in section showing a modification of my invention; Fig. 7 is a transverse section taken along the line 7—7 of Fig. 6; and Figs. 8 and 9 show further modifications of a coupling member embodying my invention.

Referring to Figs. 1 and 2 of the drawing, the header pipe 20 which could also be a pressure vessel is provided with an aperture 21 into which is fitted a coupling member 22 made according to my invention and provided with the positioning stakes or stubs 24, the coupling member receiving the connecting or distributing pipe 23. The coupling member 22 is provided with a bore having flared portions 25 and 26 to provide an inwardly directed flare, the diameter of the small portion 26 being coincident with the inner diameter of the connecting pipe 23. The coupling is counterbored to provide a shoulder 27, the connecting pipe 23 being received within the counterbore to rest on the internal shoulder 27.

In order to insure inside welding or fusing of the coupling member 22, header 20 and coupling pipe 23, I spray a silver alloy at the portions 28 and 29 of the coupling member, the diameter of the coupling member 28 being slightly smaller than bore 21 in the header pipe and the counterbore providing shoulder 27 being slightly larger in diameter than pipe 23 to be received therein. It will be noted that the lower end of the coupling member 22 has a transverse contour coinciding with the internal surface of the header 20. This may be formed by using a milling machine of the proper diameter so that the inner surface of the header 20 and the lower end of the coupling member 22 register with each other when the two are placed in proper relationship with each other for welding.

It is only necessary to drill a bore or aperture 21 of the proper diameter to receive the coupling member 22 thereby eliminating the usual procedure required in boring, filing, etc., in order to provide the desired opening, since the drilling produces a finished wall surface.

With the parts assembled, a weld is made as shown by dotted lines 30 and 31, the heat from the weld causing the silver alloy or any other suitable alloying material to flow and securely fuse or weld the internal contacting surfaces of the header member 20, coupling member 22 and the pipe 23.

Instead of utilizing inserted pins, such as 24, in the member, stakes or studs 24' integral with the coupling may be utilized as shown in Figs. 4 and 5 at 24'. These positioning stakes may be made by a slide or staking machine having the forming members 24" for forming the stake or stud in the surface of the coupling device 22'. This avoids the necessity for drilling apertures and inserting pins 24 as is the case in Figs. 3 and 4. These pins or staked tips solve a troublesome problem of properly seating the couplings, which problem has been of long standing.

In Fig. 6 is shown a form of my invention employed when a beveled aperture in the header member is utilized. The header 35 is provided with the usual beveled aperture for receiving the coupling member 37, being scarfed at 38 and welded as at 41 to the scarfed portion 40 of the conduit 39. In accordance with my invention, I provide at the lower end of the coupling member 37 which is flared as at 42 on the interior thereof with a staked lug formed from metal removed from the surface at 43', the contour of this lug being such that it registers with and contacts the beveled portion 36 of the header to seat the member with its inner end in registry with the inner surface of the header 35. The shape of the lug is also shown in Fig. 7. When the coupling member has been properly seated with the lugs 43 in position, there being four such lugs, the coupling member and header may be welded in the usual fashion. Before welding the header aperture and the surface of the coupling member are in contact for a very short length which is not beveled at the lower end of the coupling member. These surfaces may also be alloy welded as shown in Fig. 1, if desired.

This coupling member can be formed from standard pipe and the staked lugs readily formed on a staking machine by a longitudinally moving staking element, the lower end being formed, for example, by means of a milling machine to have the contour of the header with which it is to cooperate. Because of the positioning lugs, the various difficulties pointed out above are eliminated and the joint readily made.

In Fig. 8 elongated pins 45 are utilized which extend past the beveled portions of the aperture to position the coupling member.

In Fig. 9 I employ triangularly shaped lugs 46 which may be secured to the end of the member 37 prior to the positioning within the aperture.

I have thus provided a coupling which is easily and quickly positioned in registering relationship with the header and with which the time for making the welded connections is reduced to a matter of minutes, the coupling being properly and accurately seated as soon as inserted into the header.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A hollow tubular coupling member for providing a fused welded coupling between a hollow member having an aperture in the wall thereof provided with beveled edge surfaces for receiving one end of said coupling member and for engaging a tubular member at its other end, said coupling member having a bore extending therethrough, the one end of said coupling to be received within said aperture being formed to register with the internal surface of said hollow member, and a plurality of normally directed positioning elements on the exterior of said coupling member adjacent said one end, said positioning of elements being oppositely disposed and lying along a transverse axis of said coupling member and formed to engage during welding operation the beveled edge surfaces surrounding the aperture in said hollow member when said one end of said coupling member is positioned within said aperture with its said one end in registering relationship with the inner surface of said hollow member.

2. A hollow tubular coupling member for providing a fused welded coupling between a hollow member having an aperture in the wall thereof provided with beveled edge surfaces for receiving one end of said coupling member and for engaging a tubular member at its other end, said coupling member having a bore extending therethrough, the one end of said coupling member to be received within said aperture being formed to register with the internal surface of said hollow member, and a plurality of normally directed positioning elements on the exterior of said coupling member adjacent said one end, said positioning elements being oppositely disposed and lying along a transverse axis of said coupling member, said positioning elements decreasing in transverse section longitudinally of said coupling member toward the end of said coupling member received within said aperture to engage during welding operation the beveled edge surfaces surrounding the aperture in said hollow member when said one end of said coupling member is positioned within said aperture with its said one end in registering relationship with the inner surface of said hollow member.

3. A hollow tubular coupling member for providing a fused welded coupling between a hollow member having an aperture in the wall thereof provided with beveled edge surfaces for receiving one end of said coupling member and for engaging a tubular member at its other end, said coupling member having a bore extending therethrough, the one end of said coupling member to be received within said aperture being formed to register with the internal surface of said hollow member, and a plurality of normally directed positioning elements on the exterior of said coupling member adjacent said one end, said positioning elements being oppositely disposed and lying along a transverse axis of said coupling member, said positioning elements comprising staked lugs decreasing in transverse section longitudinally of said coupling member toward the end of said coupling member received within said aperture to during welding operation engage the beveled edge surfaces surrounding the aperture in said hollow member when said one end of said coupling member is positioned within said aperture with its said one end in registering relationship with the inner surface of said hollow member.

4. A hollow tubular coupling member for providing a fused welded coupling between a hollow member having an aperture in the wall thereof provided with beveled edge surfaces for receiving one end of said coupling member and for engaging a tubular member at its other end, said coupling member having a bore extending therethrough, the one end of said coupling member to be received within said aperture being formed to register with the internal surface of said hollow member, and a plurality of normally directed positioning elements on the exterior of said coupling member adjacent said one end, said positioning elements being oppositely disposed and lying along a transverse axis of said coupling member, said positioning elements comprising triangularly shaped fin-like members extending normally to the surface of said coupling member, with the transverse section decreasing toward the end of said coupling member to be received within said aperture to engage during welding operation the beveled edge surfaces surrounding the aperture in said hollow member when said one end of said coupling member is positioned within said aperture with its said one end in registering relationship with the inner surface of said hollow member.

5. A hollow tubular coupling member for providing a fused welded coupling between a hollow member having an aperture in the wall thereof provided with beveled edge surfaces for receiving one end of said coupling member and for engaging at its other end a tubular member, said coupling member having a bore extending therethrough, the one end of said coupling member to be received within said aperture being formed to register with the internal surface of said hollow member, and a plurality of normally directed positioning elements on the exterior of said coupling member adjacent said one end, said positioning elements comprising pairs of oppositely disposed elements lying along different transverse axis of said coupling member and along a contour formed by the contacting surfaces of said hollow member and said coupling member when said coupling member is received within said aperture, said positioning elements decreasing in transverse section longitudinally of said coupling member toward the end of said coupling member received within said aperture to engage during welding operation the beveled edge surfaces surrounding the aperture in said hollow member when said one end of said coupling member is positioned within said aperture with its said one end in registering relationship with the inner surface of said hollow member, and an alloy coating on the outside of said one end of said coupling member between the end of said coupling member and the contour along which said positioning elements are located.

6. A hollow tubular coupling member for providing a fused welded coupling between a hollow member having an aperture in the wall thereof provided with beveled edge surfaces for receiving one end of said coupling member and for engaging at its other end a tubular member, said coupling member having a bore extending therethrough, the one end of said coupling member to be received within said aperture being formed to register with the internal surface of said hollow member, and a plurality of normally directed positioning elements on the exterior of said coupling member adjacent said one end, said positioning elements comprising pairs of oppositely disposed elements lying along transverse axes of said coupling member at 90° to each other, said positioning elements decreasing in transverse section longitudinally of said coupling member toward the end of said coupling member received within said aperture to engage during welding operation the beveled edge surfaces surrounding the aperture in said hollow member when said one end of said coupling member is positioned within said aperture with its said one end in registering relationship with the inner surface of said hollow member.

7. A hollow tubular coupling member for providing a fused welded coupling between a hollow member having an aperture in the wall thereof provided with beveled edge surfaces for receiving one end of said coupling member and for engaging at its other end a tubular member, said coupling member having a bore extending therethrough, the one end of said coupling member to be received within said aperture being formed to register with the internal surface of said hollow member, and a plurality of normally directed positioning elements on the exterior of said coupling member adjacent said one end, said positioning elements comprising pairs of oppositely disposed elements lying along different transverse axes of said coupling member and along a contour formed by the contacting surfaces of said hollow member and said coupling member when said coupling member is received within said aperture, said positioning elements decreasing in transverse section longitudinally of said coupling member toward the end of said coupling member received within said aperture to engage during welding operation the beveled edge surfaces surrounding the aperture in said hollow member when said one end of said coupling member is positioned within said aperture with its said one end in registering relationship with the inner surface of said hollow member.

8. A hollow member having an aperture therein, the edge surfaces of said hollow member around said aperture being beveled outwardly, a tubular coupling member positioned within said aperture to provide a fused welded coupling to said hollow member, the end of said coupling member conforming to the contour of the inside wall of said hollow member, said coupling member having positioning elements spaced around its periphery and shaped to contact during welding operation with the beveled edge surfaces surrounding said aperture for seating said coupling member in registering position within said aperture, said coupling member having a bore therethrough and a weld between the outer surface of said coupling member and the beveled surface of said aperture.

9. A hollow member having an aperture therein, the edge surfaces of said hollow member around said aperture being beveled outwardly, a tubular coupling member positioned within said aperture to provide a fused welded coupling to said hollow member, the end of said coupling member conforming to the contour of the inside wall of said hollow member, said coupling member having positioning elements spaced around its periphery, said positioning elements decreasing in transverse section longitudinally of said coupling member toward the end of said coupling member within said aperture to contact during welding operation the beveled edge surfaces surrounding said aperture for seating said coupling member in registering position within said aperture, said coupling member having a bore therethrough and a weld between the outer surface of said coupling member and the beveled surface of said aperture.

10. A hollow member having an aperture therein, the edge surfaces of said hollow member around said aperture being beveled outwardly, a tubular coupling member positioned within said aperture to provide a fused welded coupling to said hollow member, the end of said coupling member conforming to the contour of the inside wall of said hollow member, said coupling member having positioning elements spaced around its periphery, said positioning elements decreasing in transverse section longitudinally of said coupling member toward the end of said coupling member received within said aperture to contact during welding operation the beveled edge surfaces surrounding said aperture for seating said coupling member in registering position within said aperture, said coupling member having a bore therethrough and a weld between the outer surface of said coupling member and the beveled surface of said aperture, and an alloy weld between the surface of said coupling member and the surface of the aperture of the hollow member below the contour along which said positioning elements lie.

11. A hollow member having an aperture therein, the edge surfaces of said hollow member around said aperture being beveled outwardly, a tubular coupling member positioned within said aperture to provide a fused welded coupling to said hollow member, the end of said coupling member conforming to the contour of the inside wall of said hollow member, said coupling member having positioning elements spaced around its periphery, said positioning elements comprising integral staked lugs decreasing in transverse section longitudinally of said coupling member toward the end of said coupling member received within said aperture to contact during welding operation the beveled edge surfaces surrounding said aperture for seating said coupling member in registering position within said aperture, said coupling member having a bore therethrough and a weld between the outer surface of said coupling member and the beveled surface of said aperture, and an alloy weld between the surface of said coupling member and the surface of the aperture of the hollow member below the contour along which said positioning elements lie.

WILLIAM W. VANDER CLUTE.

REFERENCES CITED

The following references are of record in the file of this patent:

UNITED STATES PATENTS

| Number | Name | Date |
| --- | --- | --- |
| 1,780,978 | Lutzow | Nov. 11, 1930 |
| 2,224,145 | Dugan | Dec. 10, 1940 |
| 2,249,469 | Gray | July 15, 1941 |